(12) United States Patent
Havemose

(10) Patent No.: US 10,108,478 B1
(45) Date of Patent: *Oct. 23, 2018

(54) SYSTEM AND METHOD FOR STATISTICAL APPLICATION-AGNOSTIC FAULT DETECTION

(71) Applicant: OPEN INVENTION NETWORK LLC, Durham, NC (US)

(72) Inventor: Allan Havemose, Arroyo Grande, CA (US)

(73) Assignee: Open Invention Network LLC, Durham, NC (US)

( * ) Notice: Subject to any disclaimer, the term of this patent is extended or adjusted under 35 U.S.C. 154(b) by 99 days.

This patent is subject to a terminal disclaimer.

(21) Appl. No.: 15/251,576

(22) Filed: Aug. 30, 2016

Related U.S. Application Data

(63) Continuation of application No. 14/175,484, filed on Feb. 7, 2014, now Pat. No. 9,430,309, which is a continuation of application No. 13/017,717, filed on Jan. 31, 2011, now Pat. No. 8,656,226.

(51) Int. Cl.
*G06F 11/00* (2006.01)
*G06F 11/07* (2006.01)

(52) U.S. Cl.
CPC ........ *G06F 11/079* (2013.01); *G06F 11/0706* (2013.01); *G06F 11/076* (2013.01); *G06F 11/0787* (2013.01)

(58) Field of Classification Search
CPC .................................................. G06F 11/0754
See application file for complete search history.

(56) References Cited

U.S. PATENT DOCUMENTS

| | | | |
|---|---|---|---|
| 7,072,899 B2 * | 7/2006 | Lokken | G06F 17/30592 |
| 7,934,126 B1 * | 4/2011 | Bennett | G06F 11/0706 714/26 |
| 8,151,141 B1 * | 4/2012 | Bennett | G06F 11/0706 714/26 |
| 8,656,226 B1 * | 2/2014 | Havemose | G06F 11/0715 714/47.1 |
| 9,092,331 B1 * | 7/2015 | Havemose | G06F 11/0715 |
| 9,430,309 B1 * | 8/2016 | Havemose | G06F 11/0715 |
| 2005/0198279 A1 * | 9/2005 | Flocken | G06F 11/008 709/224 |

(Continued)

*Primary Examiner* — Christopher S McCarthy

(57) ABSTRACT

A system, method, and computer readable medium for statistical application-agnostic fault detection of multi-process applications. The computer readable medium includes computer-executable instructions for execution by a processing system. A multi-process application runs on a host. Interceptors collect statistical events and sends said events to a statistical fault detector. The statistical fault detector creates one or more distributions and compares recent statistical event data to historical statistical event data and uses deviation from historical norm for fault detection. The present invention detects faults both within the application and within the environment wherein the application executes, if conditions within the environment cause impaired application performance. The invention also teaches consensus fault detection and elimination of cascading fault notifications based on a hierarchy of events and event groups. Interception and fault detection is transparent to the application, operating system, networking stack and libraries.

20 Claims, 10 Drawing Sheets

(56) References Cited

U.S. PATENT DOCUMENTS

| | | | |
|---|---|---|---|
| 2006/0026467 A1* | 2/2006 | Nehab | G06F 11/008 714/38.1 |
| 2006/0075306 A1* | 4/2006 | Chandrasekaran | G06F 11/3688 714/47.2 |
| 2008/0307266 A1* | 12/2008 | Chandrasekaran | G06F 11/3688 714/38.14 |
| 2010/0082708 A1* | 4/2010 | Kim | G06Q 10/04 707/812 |
| 2012/0151276 A1* | 6/2012 | Bjorner | G06F 11/0751 714/47.1 |
| 2012/0166869 A1* | 6/2012 | Young | G06F 11/008 714/15 |

* cited by examiner

SYSTEM AND METHOD FOR STATISTICAL APPLICATION-AGNOSTIC FAULT DETECTION

CROSS-REFERENCE TO RELATED APPLICATIONS

This application is a continuation of and claims priority from U.S. patent application Ser. No. 14/175,484, filed Feb. 7, 2014, titled SYSTEM AND METHOD FOR STATISTICAL APPLICATION-AGNOSTIC FAULT DETECTION, issues as U.S. Pat. No. 9,430,309 on Aug. 30, 2016, which is a continuation of U.S. patent application Ser. No. 13/017,717, filed Jan. 31, 2011, titled SYSTEM AND METHOD FOR STATISTICAL APPLICATION-AGNOSTIC FAULT DETECTION, issued as U.S. Pat. No. 8,656,226 on Feb. 18, 2014. This application is related to commonly assigned: U.S. patent application Ser. No. 13/017,340, filed Jan. 31, 2011, titled SYSTEM AND METHOD FOR STATISTICAL APPLICATION-AGNOSTIC, issued as U.S. Pat. No. 8,612,802 on Dec. 17, 2013, and is related to U.S. patent application Ser. No. 12/887,144, filed Sep. 21, 2010, titled SYSTEM AND METHOD FOR TRANSPARENT CONSISTENT APPLICATION-REPLICATION OF MULTI-PROCESS MULTI-THREADED APPLICATIONS, issued as U.S. Pat. No. 8,584,145 on Nov. 12, 2013, and is related to U.S. patent application Ser. No. 12/851,706, filed Aug. 6, 2010, titled SYSTEM AND METHOD FOR TRANSPARENT CONSISTENT APPLICATION-REPLICATION OF MULTI-PROCESS MULTI-THREADED APPLICATIONS, issued as U.S. Pat. No. 8,589,953 on Nov. 19, 2013, and is related to U.S. patent application Ser. No. 12/887,598, filed Sep. 22, 2010, titled SYSTEM AND METHOD FOR RELIABLE NON-BLOCKING MESSAGING FOR MULTI-PROCESS APPLICATION REPLICATION, issued as U.S. Pat. No. 9,141,481 on Sep. 22, 2015 and is related to U.S. patent application Ser. No. 12/887,651, filed Sep. 22, 2010, titled SYSTEM AND METHOD FOR RELIABLE NON-BLOCKING MESSAGING FOR MULTI-PROCESS APPLICATION REPLICATION, issued as U.S. Pat. No. 8,281,184 on Oct. 2, 2012, and is related to U.S. patent application Ser. No. 11/213,678, filed Aug. 25, 2005, titled METHOD AND SYSTEM FOR PROVIDING HIGH AVAILABILITY TO COMPUTER APPLICATIONS, issued as U.S. Pat. No. 8,122,280 on Feb. 21, 2012, and is related to U.S. patent application Ser. No. 12/334,660, filed Dec. 15, 2008, entitled METHOD AND SYSTEM FOR PROVIDING CHECKPOINTING TO WINDOWS APPLICATION GROUPS, issued as U.S. Pat. No. 9,286,109 on Mar. 15, 2016, and is related to U.S. patent application Ser. No. 12/334,651, filed on Dec. 15, 2008, titled METHOD AND SYSTEM FOR PROVIDING STORAGE CHECKPOINTING TO A GROUP OF INDEPENDENT COMPUTER APPLICATIONS, issued as U.S. Pat. No. 8,037,367 on Oct. 11, 2011, the disclosures of each of which are incorporated herein by reference in their entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains to detection of run-time faults in applications running on computer systems, computer networks, telecommunications systems, embedded computer systems, wireless devices such as tablets, cell phones and PDAs, and more particularly to methods, systems and procedures (i.e., programming) for fault detection, where the core fault detection runs independently and transparently to the applications being fault detected.

2. Description of Related Art

In many environments one of the most important features is to ensure that a running application remains operational and known to be operating without any faults. Specifically, if the application or something in the environment where the application executes somehow prevents accurate and fault-free operation, it is generally paramount to detect the application mal-function and initiate corrective action. By way of example: mission critical systems in telecommunications, military, financial and embedded applications must operate reliably and accurately and any fault may cause loss of customer data, customer connectivity or total loss of service. The autopilot on an airplane must continue to operate even if some of the software malfunctions, the 911 emergency phone system must continue to operate even if the main phone system if severely damaged, and stock exchanges deploy software that keep the exchange running even if some of the routers and servers go down. Today, the same expectations of "fault-free" operations are being placed on commodity computer systems and standard applications.

The present invention builds on the teachings in U.S. patent application Ser. No. 12/334,651, wherein Havemose teaches METHOD AND SYSTEM FOR PROVIDING HIGH AVAILABILITY TO COMPUTER APPLICATIONS. Havemose teaches system and methods for transparent and automatic fault detection built on a combination of pre-loading shared libraries and installing fault detectors within said pre-loaded libraries. In Ser. No. 12/334,651 node and crash-faults are detected with fault detectors that are application agnostic and work without requiring any application customizations. Application specific faults are detected using custom health-checks. Patent application Ser. No. 12/334,651 is included by reference in its entirety.

The present invention adds support for a larger class of "soft faults", where the application appears functional, but for some reason no longer is operating properly. The present invention provides fault detections for the larger class of software fault in a manner that is transparent and automatic, i.e. which requires no modification to the application being monitored and generally operates without needing customization for any particular application.

By way of example, consider the web portal for an eCommerce web site. Friday night the underlying storage array experiences a hard disk failure and the ability to keep up with the customer traffic is dramatically reduced. While the eCommerce application is functioning properly, the service it provides is impaired. Data requests start backing up as the impaired storage array cannot handle the traffic, and at some point, maybe several hours after the hard disk failure, the eCommerce application no longer can process and store customer records. So while the eCommerce application theoretically is operating properly, the actual run-time characteristics of the application is faulty as the eCommerce application ultimately loses customer records and stops processing purchasing requests.

The present invention provides system and methods for accurately detecting such run-time malfunctions of applications, independently if whether the faulty operation is caused by the application itself or something in the environment wherein the application executes. This is accomplished by building a statistical description of the running application and by, at run-time, comparing the currently running application to the statistical model in order to detect abnormal conditions. The statistical model is built automatically without requiring any pre-defined knowledge of the application being monitored, and the statistical model automatically adapts to changes in environment. The finer details of the present invention are disclosed in the following sections.

In U.S. Pat. No. 5,465,321 Smyth teaches HIDDEN MARKOV MODELS FOR FAULT DETECTION IN DYNAMIC SYSTEM. Smyth uses a hidden Markov model to model the temporal context and builds symptom-fault mappings based on said underlying Markov model. In other words, the invention is provided within the context of a particular Markov model, and is not general across all models.

In U.S. patent application Ser. No. 10/433,459 Thottan et al teach FAULT DETECTION AND PREDICTION FOR MANAGEMENT OF COMPUTER NETWORKS. The teachings of Thottan focuses on the statistical behavior of the management information base (MIB) variables and the teachings thus apply specifically to detection of faults in networks as indicated by the MIB.

In U.S. Pat. No. 5,748,882 Huang teaches APPARATUS AND METHOD FOR FAULT-TOLERANT COMPUTING. Huang teaches apparatus and method for node and application fault detection that requires extensive modification to the applications being fault detected. Furthermore Huang offers no teachings for detection of soft fault as provided by the present invention.

The prior art thus require extensive customization of the applications being fault-detected (Huang), limits the fault assumptions to a particular model (Smyth) or focuses the fault detection on a particular subsystem or class of fault-detectors (Thottan). In each case, the fault detectors make very specific assumptions regarding the classes and types of faults being detected, require extensive customization, or are limited to certain subsystems. And none of the cited prior art handle the types of soft fault where an application appears functional, but has degraded to the point of being non-functional.

There is therefore a need for a fault detection service that runs fully transparent to the applications, runs on standard operating systems, and operates generically across subsystems and fault scenarios. The present invention provides fault detection that is loaded dynamically along with the applications being monitored. The present invention builds a dynamic statistical model of the running application without making any assumptions about underlying distributions or dynamic model, and makes statistical fault-detections by comparing run-time characteristics against the previously built statistical model. The present invention works on standard operating systems, requires no custom kernels, system libraries, or custom applications.

BRIEF SUMMARY OF THE INVENTION

The present invention provides systems and methods for application-agnostic fault-detection that requires no modification to the applications being checkpointed (i.e. is transparent), works independently of which application is being monitored (i.e. is application agnostic), and works on commodity operating system and hardware.

The term "fault" is used to designate an abnormal condition or defect of a component, software, sub-system or equipment. Examples of faults include a power supply burning out, a CPU overheating, a software bug that crashes an application, or an environmental condition that makes an application not operate correctly. Faults can happen at any time and are thus non-deterministic, i.e. unpredictable. The term "Fault Detection" designates the mechanism used to detect that a fault has occurred. The present invention discloses an application-agnostic statistically based approach to fault detection that covers a very broad range of application faults.

The following terms are also used throughout the disclosures:

The terms "Windows" and "Microsoft Windows" are utilized herein interchangeably to designate any and all versions of the Microsoft Windows operating systems. By example, and not limitation, this includes Windows XP, Windows Server 2003, Windows NT, Windows Vista, Windows Server 2008/2010, Windows 7, Windows Mobile, and Windows Embedded. The operation, interfaces, and design of Microsoft Windows is well documented on the web at msdn.microsoft.com.

The terms "Linux" and "UNIX" is utilized herein to designate any and all variants of Linux and UNIX. By example, and not limitation, this includes RedHat Linux, Suse Linux, Ubuntu Linux, HPUX (HP UNIX), and Solaris (Sun UNIX). The design and operation of the Linux operating system is well documented both on the web and specifically at www.kernel.org.

The term "node" and "host" are utilized herein interchangeably to designate one or more processors running a single instance of an operating system. A virtual machine, such as a VMware, KVM, or XEN VM instance, is also considered a "node". Using VM technology, it is possible to have multiple nodes on one physical server.

The terms "application" or as appropriate "multi-process application" are utilized to designate a grouping of one or more processes, where each process can consist of one or more threads. Operating systems generally launch an application by creating the application's initial process and letting that initial process run/execute. In the following teachings we often identify the application at launch time with said initial process.

As an application is a grouping of one or more processes, an application may thus be comprised of one or more other applications, each of which in turn is comprised of one of more processes. This hierarchy of application may continue to any depth without loss of generality.

In the following we use commonly known terms including but not limited to "client", "server", "API", "process", "process ID (PID)", "thread", "thread ID (TID)", "stack", "kernel", "kernel module", "loadable kernel module", "heap", "files", "disk", "CPU", "CPU registers", "storage", "memory", "memory segments", "address space", "semaphore", "loader", "system loader", "system path", "sockets", "TCP/IP", "http", "ftp", "Inter-process communication (IPC), "POSIX", and "signal". These terms are well known in the art and thus will not be described in detail herein.

In the following we use commonly known terms and concepts from statistics, including but not limited to mean, average, standard deviation, deviation, standard error, variance, Normal distribution, Gaussian distribution, and statistical significance. These terms are well known in the art and will thus not be described further herein. Later in the disclosures broader definitions of some of terms are introduced.

The term "transport" is utilized to designate the connection, mechanism and/or protocols used for communicating across the distributed application. Examples of transport include TCP/IP, UDP, Message Passing Interface (MPI), Myrinet, Fibre Channel, ATM, shared memory, DMA, RDMA, system buses, and custom backplanes. In the following, the term "transport driver" is utilized to designate the implementation of the transport. By way of example, the transport driver for TCP/IP would be the local TCP/IP stack running on the host.

The term "interception" is used to designate the mechanism by which a library or system call is re-directed to a new implementation. On Linux and other UNIX variants interception may be achieved by a combination of LD_PRELOAD, wrapper functions, identically named functions resolved earlier in the load process, and changes to the kernel sys_call_table. On Windows, interception may be achieved by modifying a process' Import Address Table and creating Trampoline functions, as documented by "Detours: Binary Interception of Win32 Functions" by Galen Hunt and Doug Brubacher, Microsoft Research July 1999". Throughout the rest of this document the terminology interception is used to designate the functionality across all operating systems. The terminology pre-loading is used to designate the process of loading the interceptors into the application's address space on all operating systems.

The term "transparent" is used herein to designate that no modification to the application is required. In other words, the present invention works directly on the application binary without needing any application customization, source code modifications, recompilation, re-linking, special installation, custom agents, or other extensions.

To avoid simultaneous use of shared resources in multi-threaded multi-process applications locking is used. Several techniques and software constructs exists to arbitrate access to resources. Examples include, but are not limited to, mutexes, semaphores, futexes, critical sections and monitors. All serve similar purposes and often vary little from one implementation and operating system to another. In the following, the term "Lock" is used to designate any and all such locking mechanism. Properly written multi-process and multi-threaded application use locking to arbitrate access to shared resources The context of the present invention is an application on a host, i.e. a server, PC, laptop, cell phone, PDA, tablet, or other computing device. An application may be single-process or multi-process, and may contain one or more threads.

As part of loading an application interceptors are loaded. The interceptors collect statistical events and sends said events to a statistical fault detector (SFD). Statistical events, also called events or event samples, may be used to collect relevant statistical data about how an application executes. Interception is transparent and work automatically in the background.

Another aspect of the present invention is that events may be grouped into Event Groups. The grouping of events serves to associated similar or related events into larger groups, and to facility consensus fault detection and elimination of duplicate fault-detections for cascading faults.

Another key aspect is that the processing of events within the statistical fault detector is done outside the application being fault detected.

A key aspect of the present invention is that faults in the environment that cause impaired performance of the application may be detected as well.

Another aspect is that the SFD builds historical distributions based on the statistical events, and may generate multiple distributions based on one event. Example distributions include raw event distributions, temporal event distributions, and spatial event distributions.

Yet another aspect is transformation of statistical events. Each event may be transformed any number of times, and multiple new events or event groups generated from said transformed events.

Fault detection is achieved by comparing recent statistical events to the historical distributions and by detecting statistically significant deviation from the historical norms. Several different approaches to statistical significance are taught including using Gaussian distributions and custom confidence interval calculations which are disclosed.

Another aspect is that temporal distributions use a temporal filter such as time-of-day, day-of-week, and spatial distribution use a spatial filter such as node-name or transport.

Yet another aspect of the present invention is that the event hierarchy is traversed from the events to the all-inclusive event group providing consensus fault detection and elimination of duplicate fault-detections for cascading faults.

Another aspect of the present invention is that the teachings apply to cloud computing deployments, distributed deployments, individual servers and desktops, as well as classic data center deployments.

A further aspect of the present invention is that it can be provided on commodity operating systems such as Linux and Windows, and on commodity hardware such as Intel, AMD, SPARC and MIPS. The present invention thus works on commodity operating systems, commodity hardware with standard (off the shelf) software without needing any further modifications.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention will be disclosed in relation to FIG. 1 through FIG. 10 It will be appreciated that the system and apparatus of the invention may vary as to configuration and as to details of the constituent components, and that the method may vary as to the specific steps and sequence, without departing from the basic concepts as disclosed herein.

0. INTRODUCTION

The context in which this invention is disclosed is an application running on a server or other computing device. Without affecting the general case of multiple applications, the following disclosures often depict and describe just one application. Multiple applications are handled in a similar manner.

Likewise, the disclosures generally describe applications with one or two processes; any number of processes is handled in a similar manner. Finally, the disclosures generally describe one or two threads per process; any number of threads is handled in a similar manner

1. OVERVIEW

Figure 1:
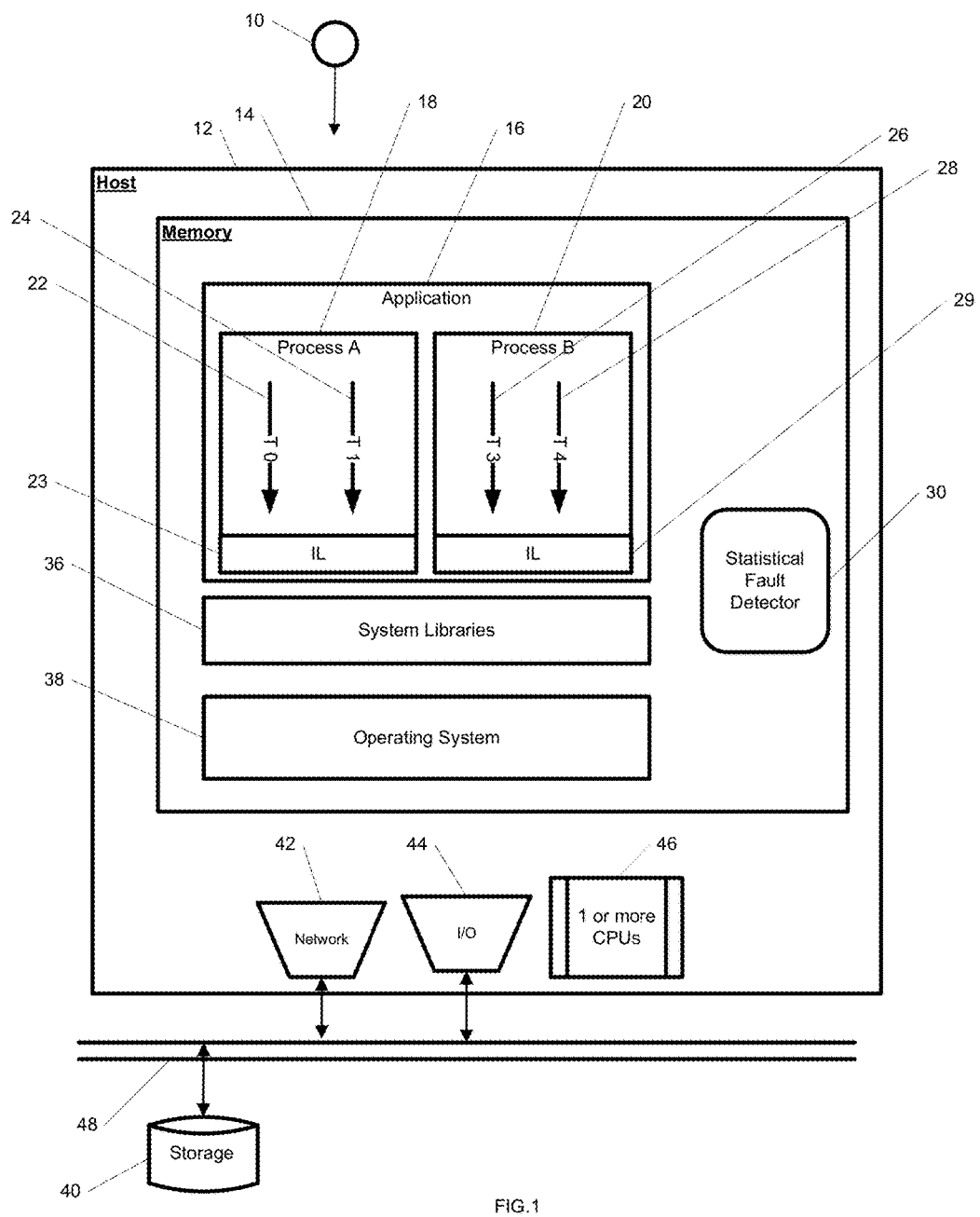
FIG. 1 is a block diagram of the core system architecture.

FIG. 1 illustrates by way of example embodiment 10 the overall structure of the present invention. The following brief overview illustrates the high-level relationship between the various components; further details on the inner workings and interdependencies are provided in the following sections. FIG. 1 Illustrates by way of example embodiment 10 a host 12 with an application 16 loaded into system memory 14. The application 16 is comprised of two processes; process A 18 and process B 20. Each of the two processes has two running threads. Process A contains thread T0 22 and thread T1 24, while process B contains thread T3 26 and thread T4 28. As part of loading the application 16 an interception layer (IL) 23, 29 is pre-loaded into the address space of each process. Interception Layer 23 for process A is preloaded into process A's address space and Interception Layer 29 is preloaded into process B's address space. The interception layers 23, 29 assist in building the statistical model for the application 16. The system libraries 36 are generally interposed between the application 16 and operating system 38. The interceptors communicate with the Statistical Fault Detector (SFD) 30, which is the module responsible for building the statistical model of the application and for issuing fault detection events.

System resources, such as CPUs 46, I/O devices 44, Network interfaces 42 and storage 40 are accessed using the operating system. Devices accessing remote resources use some form of transport network 48. By way of example, system networking 42 may use TCP/IP over Ethernet transport, Storage 40 may use Fibre Channel or Ethernet transport, and I/O 44 may use USB.

FIG. 1 illustrates the system libraries 36 as separate from the application 16 and the individual processes process A 18 and process B 20. The system libraries are generally shared libraries. For clarity of presentation, the system libraries are depicted outside the address space of the individual processes, even though some library state and code is present within the address space of the individual application processes.

Figure 2:
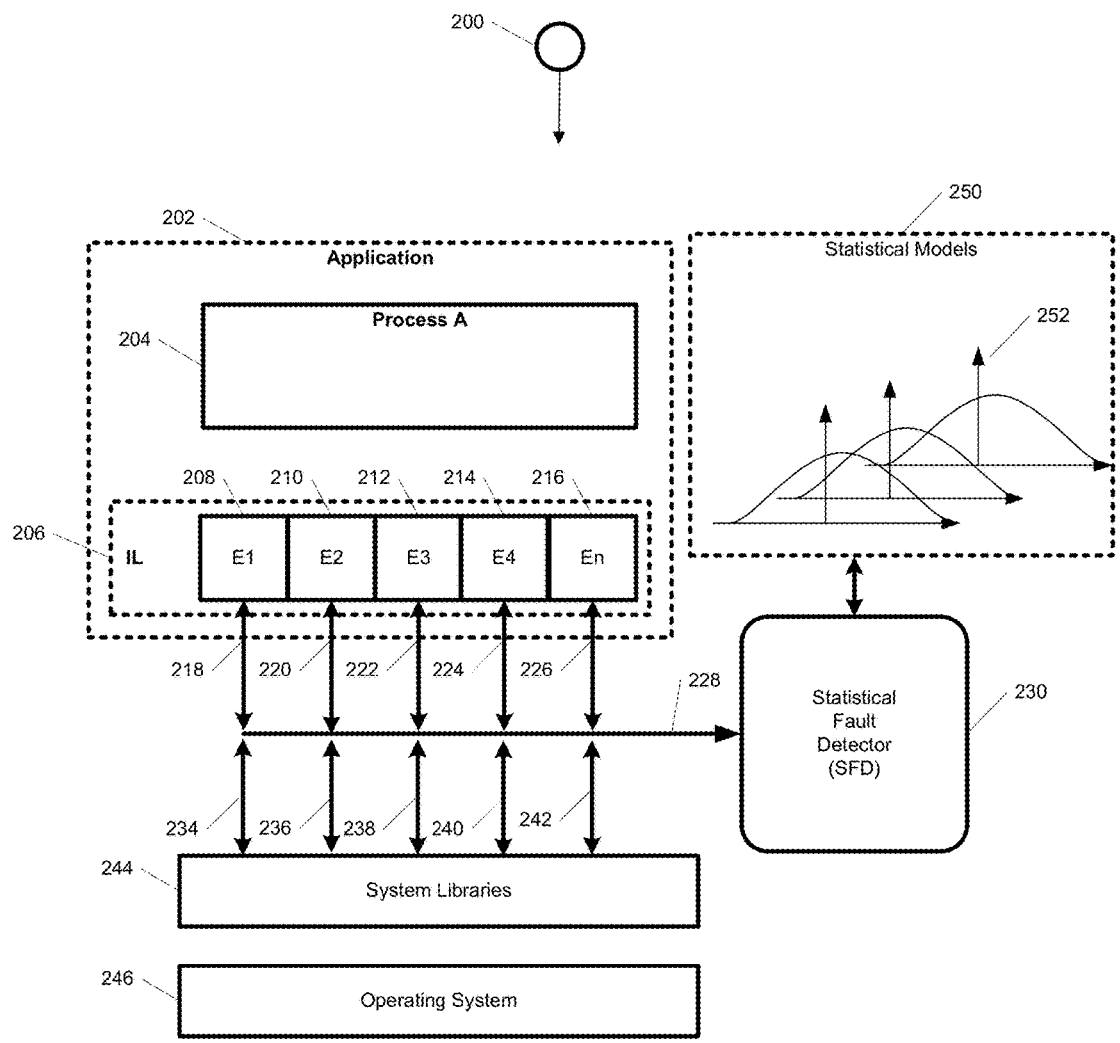
FIG. 2 is a block diagram illustrating high-level interception flow.

FIG. 2 illustrates by way of example embodiment 200 the high-level interception flow. By way of example, and not limitation, an application 202 is comprised of one process 204; multiple processes are handled in a similar manner. The interception layer (IL) 206 intercepts calls to the system libraries and operating system. To better illustrate the operation, FIG. 2 illustrates an IL 206 with 'n' interceptors E1 208 through En 216.

Interceptors are furthermore divided into Event Groups (EGs). Example groupings include, but are not limited to: I/O, networking, memory, processes, threads, and security. The primary purpose of the event groups is to group (or associate) related functionality and more conveniently express statistical relationships and properties among interceptors within a group. By way of example, it is more likely that two interceptors related to file operations have correlated behavior, than one interceptor for a file operation and one interceptor for thread management. However, the grouping is arbitrary, and as disclosed above, only serve to more conveniently express statistical relationships between similar, and thus likely related, interceptors. The association of events with specific event groups is provided within the Statistical Fault Detector, and further disclosed below.

Referring again to FIG. 2 for example embodiment 200, E1 208 intercepts a function, collects statistical data 218, delivers said data 228 to the Statistical fault detector 230, and calls the real library call 234. Upon completing the library call 234 further statistical data is collected and sent 228 to the SFD 230, and the call returns 218. Likewise for E2 210, E3 212, E4 214 and En 216, data is collected 220, 222, 224 and 226 respectively and delivered 228 to the SFD 230, the calls finished 236, 238, 240 and 242, more statistical data sent 228 and the calls returned 220, 222, 224 and 226 respectively.

In the example embodiment 200 and associated disclosures the intercepted calls terminate 234, 236, 238, 240 and 242 in the system library. Identical teachings apply if the calls terminated in a non-system library, the kernel or other library.

The Statistical Fault Detector (SFD) 230 builds a statistical model 250, 252 for every intercepted call 206. Said statistical models adapt as newly intercepted data is added and older data is discarded. The SFD is disclosed in further detail below.

2. INTERCEPTION

Figure 3:
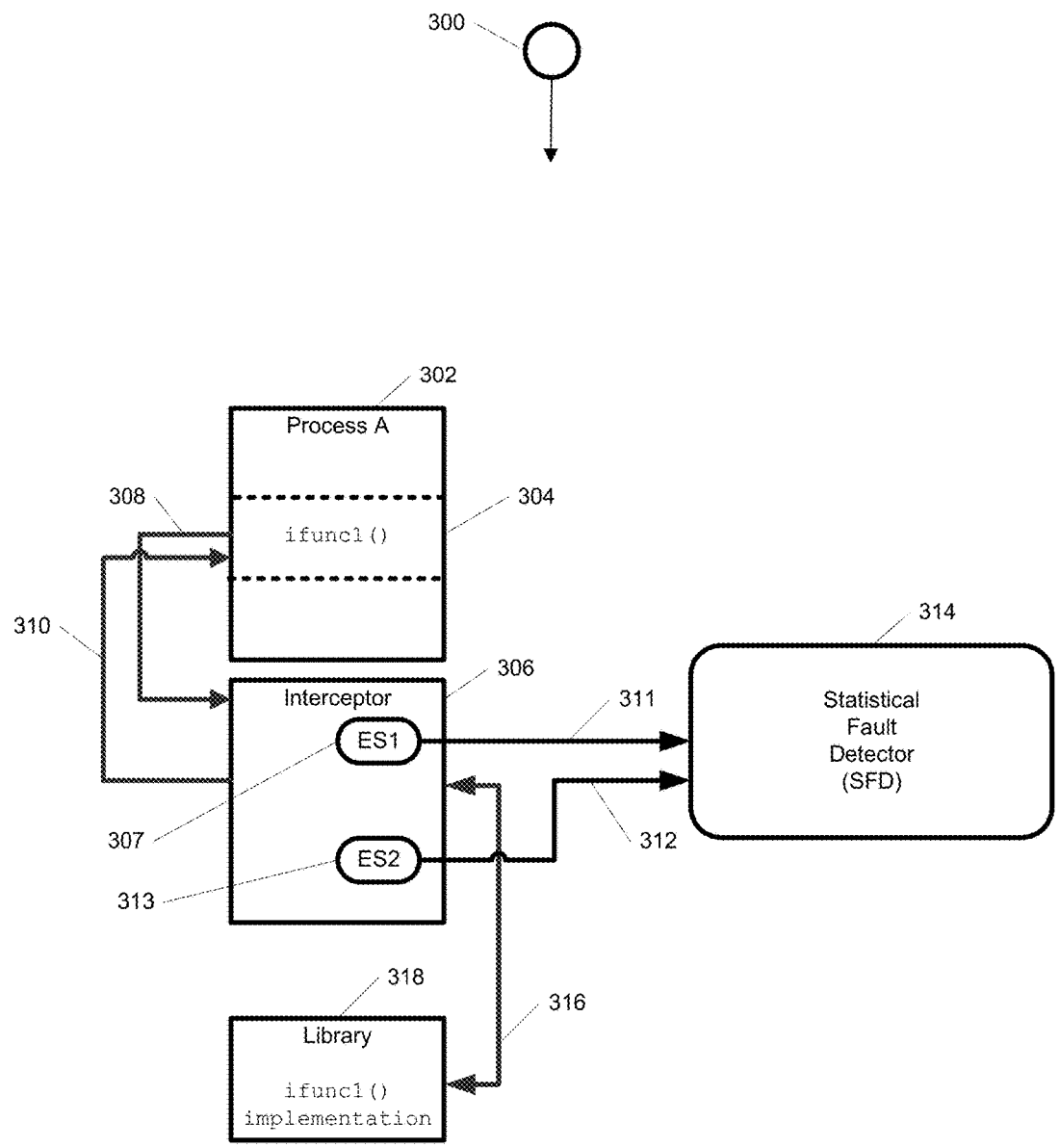
FIG. 3 is a block diagram illustrating interception in more details and interaction with the SFD.

FIG. 3 illustrates by way of example embodiment 300, the core interception architecture for an application with one process, process A 302, and with interceptor 306. By way of example, ifunc1( ) is subject to interception. When process A reaches 304 ifunc1( ) it is intercepted 308 and the call redirected to the interceptor 306. The interceptor collects relevant statistical information about ifunc1( ). In the following said statistical information is called an event sample (ES) or simply an event. Event samples are further defined below.

First an event sample ES1 307 is created. At this time the implementation 318 of ifunc1( ) has not been called, and ES1 therefore contain information about the intended behavior of ifunc1( ). By way of example, if ifunc1( ) is a call to write data, ES1 307 may contain the number of bytes to be written, the name of the file, and the file attributes. The initial Event Sample ES1 307 is sent 311 to the Statistical Fault Detector (SFD) 314.

The interceptor then calls the implementation for ifunc1( ) 316, 318. Upon returning from the library implementation 316 the return value and a second Event Sample ES2 313 is created. ES2 313 contains the results of calling the implementation of ifunc1( ), including any error values, and optionally contains information such as the time it took to complete the implementation of ifunc1( ) 318. ES2 313 thus contain event sample information representing the actual behavior of ifunc1( ). ES2 313 is then sent 312 to the SFD 314.

The interceptor then returns 310 to ifunc1( ) 304 in process A 302. Upon returning to the caller 310 Process A resumes execution and process A is unaware that the call to ifunc1( ) was intercepted and one or more statistical events generated.

In an alternate embodiment, only one event sample is generated for each interception. ES 307 is collected but never transmitted, and later combined into ES2 313, which is transmitted 312 to the SFD 314. Combining ES1 and ES2 produces fewer transmitted messages to the SFD 314, but loses the ability to easily separate intended behavior from actual behavior. In yet another embodiment ES2 is used to baseline all statistical events, and there is no distinction between intended behavior and actual behavior.

In a preferred embodiment the interception layer is implemented as a shared library and pre-loaded into each application process' address space as part of loading the application. Shared libraries are generally implemented in such a way that each instance of the interception layer share the same code, but have their own private data. In a multi-process application the interception layer is therefore comprised of one interception layer per application process, and together the process-level interception layers comprise the interception layer for the entire application.

A related issue with interception is that intercepted functions may call other intercepted functions. As long as said calls are performed using public intercepted names, the previous teachings fully describe the interception. At times shared-library developers take shortcuts and don't use the public names, but refer directly to the implementation using a private name. In such cases, the interceptor may overlay a copy of the intercepted shared library code using fully resolved public function names.

3. STATISTICAL FAULT DETECTOR (SFD)

The SFD receives all the individual event samples, and uses the event samples to create a statistical model for each event type and possibly one or more event groups. The SFD creates models for both individual events and event groups, as event groups may be used to find faults across a subsystem before the individual events are showing faults with statistical significance.

3.1 Event Samples (ES).

By way of example, we examine the event samples for two functions from the standard I/O library, often referred to as stdio.h (http://en.wikipedia.org/wiki/Stdio.h):
1. FILE *fopen(const char *path, const char *mode);
2. size_t fwrite (const void *array, size_t size, size_t count, FILE *stream);

Referring to the signatures of the two methods, fopen opens a file with filename and path "*path" and mode field as indicated in "*mode". The result of fopen ( ) is returned as NULL if fopen( ) failed, or a pointer to the FILE if fopen ( ) succeeded. Similarly, fwrite( ) writes "count" data blocks of size "size" contained in "*array" to the file indicated by "*stream". The operation and definitions of in stdio.h are well known to anyone skilled in the art, and will thus only be explained to the extent necessary to fully teach the present invention.

Event Samples for fopen( ) captures data relevant to building a statistical model for the operation of fopen( ). Said data include, but may not be limited to: time stamp, file name (*path), mode (*mode), and state of file pointer (*FILE).

Event Samples for fwrite( ) captures data relevant to building a statistical model for the operation of fwrite( ). Said data include, but may not be limited to: time stamp, file pointer (*stream), data (*array), size of data blocks (size), and number of blocks (count).

Each event is assigned an event type, corresponding to the type of function being intercepted. By way of example fopen( ), fwrite( ) and fread( ) would be assigned separate and distinct event types. A time stamp (TS) is included in all Event Samples and designates the time at which the event was created.

The Event thus consists of data with the following structure:

EventType, TimeStamp, <Event Specific Data>

In a preferred embodiment EventType is encoded as an integer, while in an alternate embodiment the EventType is encoded as a string or XML. The creation of the statistical model for Events is disclosed below.

3.2 Event Groups

Event groups, as disclosed above, are groupings of related interceptors. By way of example, functions in stdio.h may be grouped into one event group. The benefits of grouping may be illustrated by way of example: A fault causing e.g. fwrite( ) to fail for a particular file, will likely also cause following fread( ), getchar( ), fputs( ) and other stdio.h functions to fail for the same file. One fault may thus cause a cascade of related fault and while one fault in e.g. fwrite( ) may be difficult to detect, the cascade of many faults in the Event Group may reach statistical significance sooner than the individual events.

Event Groups are thus an effective way to detect faults in cases where a larger number of separate faults together reach statistical significance. The creation of a statistical model for event groups is disclosed below.

In a preferred embodiment events are assigned at least one event group corresponding to the library or module wherein the interceptor is implemented. An event may be a member of more than one event group as is disclosed below.

3.3 Processing Events

Figure 4:
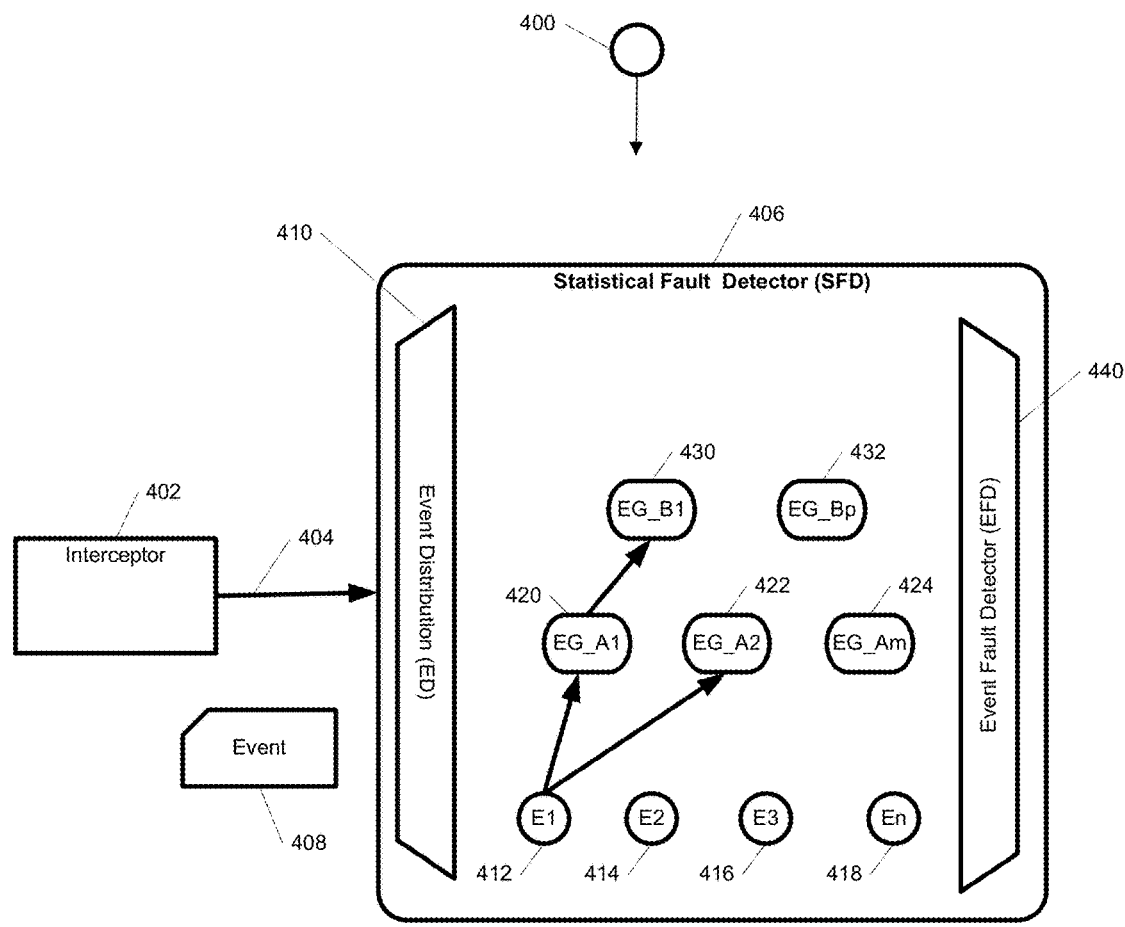
FIG. 4 is a block diagram illustrating processing within the SFD.

FIG. 4 illustrates by way of example embodiment 400, the initial stages of event processing within the SFD 406. As previously disclosed, events 408 are generated within the interceptors 402 and sent 404 to the SFD. Upon arriving at the SFD, the incoming events are processed by the Event Distribution (ED) 410 module.

As previously disclosed, each event may belong to one or more event groups, and disclosed in section 4.5 below, is organized into a hierarchy of events and event groups. Said event groups and event group hierarchy is maintained within the SFD, and is thus available to the ED facility. By way of example 'n' distinct events are supported: event E1 412, E2 414, E3 416 and En 418. Event groups EG_A1 420, EG_A2 422, EG_Am 424, EG_B1 430, and EG_Bp 432 are example event groups. E1 412 is a member of EG_A1 420 and by association in Event Group EG_B1 430. The event group hierarchy is further disclosed below.

Processing of Event E1 412 proceeds as follows: The event group hierarchy for Event E1 412 is identified, and the event E1 412 is passed to EG_A1 420 and EG_B1 430. The single event E1 is thus processed by the core event E1 and all event groups in which E1 is a member. The Event Fault Detector (ETD) infrastructure 440 for said events and event groups are further disclosed below.

Said processing of events is now further disclosed.

4.0 STATISTICAL MODEL OF EVENTS

The statistical models for Events in the present invention address the following factors:
1. Raw Event distribution without time factor
2. Temporal Event Distribution where by way of example time of day, day of week, or day of month are factored into the distribution.
3. Spatial Event Distributions where distributions are aggregated across multiple systems and networks, including systems that are co-located or located at multiple geographic locations.
4. Transformation of events to facility processing and creation of distributions or creation of additional events.

All of said factors may influence fault detection, and may be in use to both accurately detect a system fault or to accurately eliminate a system fault. By way of example, consider a large enterprise email system, where every Monday at 8:00 the email system gets unusually busy based on everyone coming back to work after the weekend. While the unusual traffic profile may indicate a problem, and the likely slower response times may indicate a problem, the temporal distribution will likely show that Monday's around 8 AM have unusually heavy traffic. The interplay of the temporal weekly distribution with the raw traffic distribution thus provide a mechanism to avoid falsely designate the Monday 8 AM slow response times as a fault condition.

4.1 Raw Event Distribution (RED) and DV:

The Raw Event Distribution (RED) is comprised of a specific amount of recent events. By way of example, the raw event distribution may consist of the most recent 100,000 events without consideration as to when the events took place. As a new event arrives, the oldest one is removed. The specific number of events may be pre-defined or may be dynamically determined using, by way of example, frequency of data, dynamic data range, minimum number of events for statistical significance, or other measurement.

Figure 5:
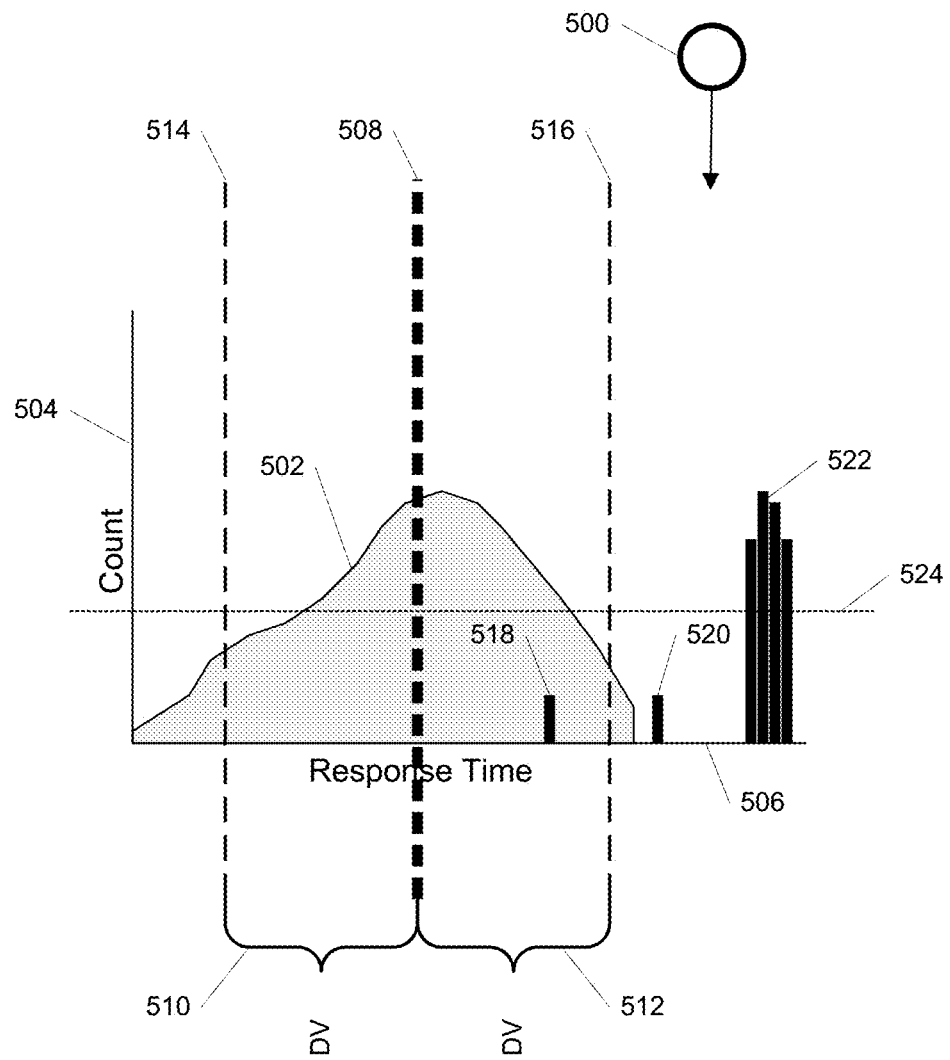
FIG. 5 is a block diagram illustrating a raw event distribution.

FIG. 5 illustrates by way of example embodiment 500 a raw event distribution 502 for a specific event type. The event type is "response time" for an event and the distribution is a distribution of response time 506 versus the number of times ("Count") 504 the specific response time occurred. As part of the distribution the mean 508 is calculated. Additionally, a measure of "Distribution-Variability" ("DV") is calculated 510, 512. Examples of said "distribution-variability" are standard deviation and standard error, but other custom error measures may also be used. A custom distribution-agnostic DV is given below. The calculation of mean, standard deviation and standard error are well known in the art and will thus not be further disclosed herein.

Generally, standard deviation and standard error are used in the context of the Normal, also called Gaussian, distribution. However, without knowledge about the distribution, many of the "well-known" facts about the standard deviation and its properties may no longer be assumed true. A simpler distribution-agnostic DV may be calculated as follows: sort all events in the distribution and remove the top x % and the bottom x %. The remaining interval may be interpreted as 2*DV, and the mean be set to the median value of the distribution. This approach ensures distribution-agnostic values of mean and DV and provides specific measurement of the distribution and its variability. By way of example, the DV may be calculated by removing the top 5% and the bottom 5% of all events.

The interval from the mean minus DV 514 to the mean plus DV 516 thus contains the majority of all events and may be used to determine if an event is a normal event or an abnormal event. By way of example, if an event 518 is contained within the interval [mean-DV;mean+DV] it may be assumed that this is a normal event and that everything is working according to historical norms. If an event arrives outside 520 [mean-DV;mean+DV] it may be assumed that this is an abnormal event and that something may be working improperly. If the event outside the interval only occurs a few times and then disappears 520 it was likely a spurious issue that may be ignored. If however, there are multiple events clustered over a range 522, it may be assumed that something has gone wrong and that corrective action is required. To determine if multiple events occur in sufficient numbers to merit corrective action, the number of clustered events outside the [mean-DV;mean+DV] interval may be compared to the average number of events for events with the [mean-DV,mean+DV] interval 524. Other measurements to determine sufficient number of events may be average number of events plus a fraction of standard deviation, or other custom statistical measure.

The above teachings thus provide a distribution-agnostic mechanism to determine if events are within the historical characteristics of an event distribution or if the events fall sufficiently outside the historical characteristics to trigger fault detection. In the context of fault detection, the most recent events are compared to the reference distribution.

The teachings use the terminology "statistical significance" to designate that a sufficient number of, generally recent, events have taken place within or outside the DV interval. The interval from mean minus DV to mean plus DV may also be interpreted as the "confidence interval" for the event distribution. These are broader definitions than typically found in statistics, where statistical significance and confidence intervals often are expressed in the context of a particular distribution.

4.2 Temporal Event Distribution (TED)

The Temporal Event Distribution (TED) is built on the Raw Event Distribution (RED) with one significant addition. TEDs are a subset of the REDs, and only contain events that meet specific temporal filter. Example temporal filters are: Time of Day, Day of Week with Time of day, and day of month with time of day.

Figure 6:
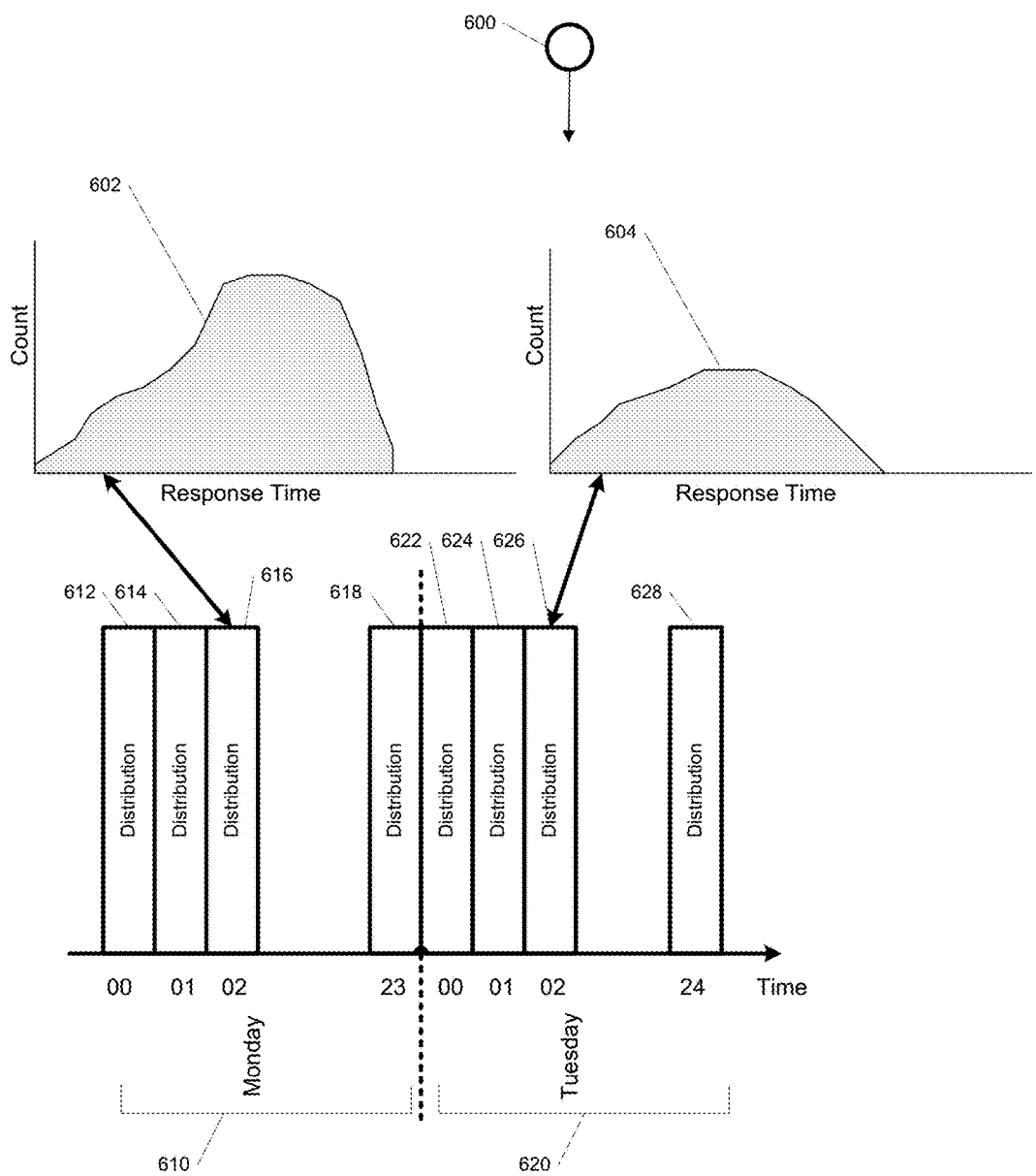
FIG. 6 is a block diagram illustrating a temporal event distribution.

FIG. 6 illustrates by way of example embodiment 600 the Temporal Event Distribution with two days. More than two days are handled in a similar manner. The first day Monday 610 is by way of example broken into hourly distributions. By way of example, block 00 612 contains all events occurring between 00:00 up to an excluding 01:00. Block 01 614 contains all events occurring between 1:00 up to and excluding 2:00, block 02 616 contains all events occurring between 02:00 up to and excluding 03:00, and block 23 618 contains all events occurring between 23:00 up to and excluding 24:00. Similarly, Tuesday 620 is broken into 24 hourly distributions with 622, 624, 626, 628 each corresponding to an hour of the day.

All events for a day are thus divided among hourly blocks, and each block of events comprise a separate distribution. By way of example, the Raw Event Distribution (RED) 602 for block 02 616 on Monday 610 is comprised of all events on Monday falling within the specified time window. Similarly, block 02 626 on Tuesday contains the RED 604 corresponding to the same time interval, but only containing events from Tuesday.

The example Raw Event Distributions 602, 604 thus describe events within the 02:00 through and excluding 03:00 timeframe on Monday and Tuesday respectively.

In an alternate example embodiment the day of week is disregarded and all events are divided into 24 separate hourly blocks. In yet another example embodiment the chosen interval is 10 minutes, and each day therefore contains 144 separate Raw Event distributions.

It is obvious to someone with ordinary skills in the art, that any time window may be used and any combination of one or more time constraints may be used to group the event data without affecting the teachings.

4.3 Spatial Event Distribution (SED)

In a deployment with multiple systems, each system may have its own independent set of distributions. Similarly, events from multiple independent systems may be combined into one distribution describing the total system wide behavior. Similarly, subnets, transports, storage subsystem, and other system-level characteristics may be used to define the spatial filter. Similarly, a subset of hosts, subnets, transports, storage subsystems, or other system-level characteristics may be used to filter and thus define a spatial distribution.

Figure 7:
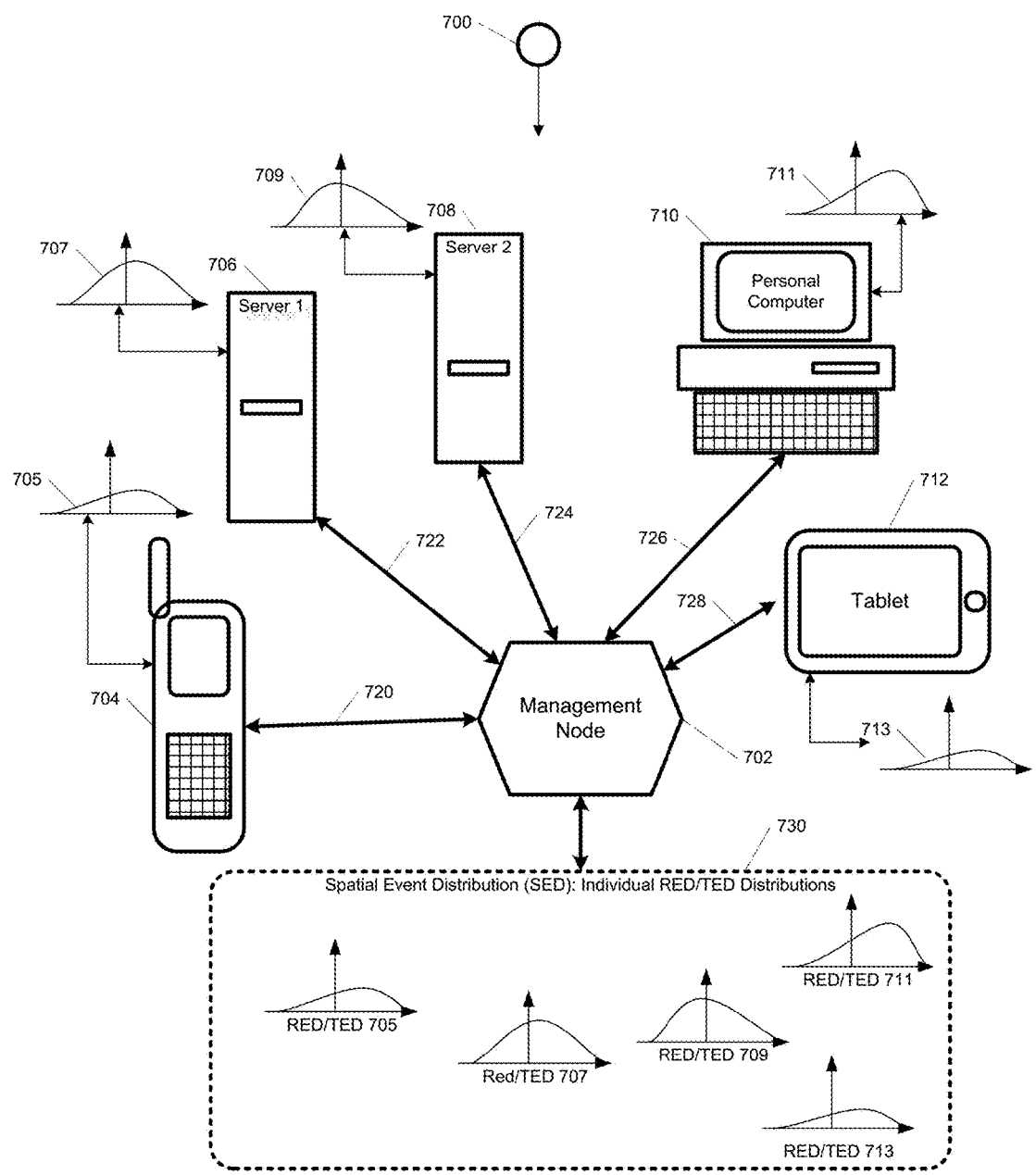
FIG. 7 is a block diagram illustrating a spatial event distribution.

FIG. 7 illustrates by way of example embodiment 700 a management node 702 with five attached devices. A cell phone or PDA 704, two servers 706, 708, a desktop PC 710, and a Tablet 712. Any number of devices is handled in a similar manner.

Each device has associated Raw Event Distributions (REDs), and Temporal Event Distributions (TEDs): The RED/TED Distributions 705 for the cell-phone/PDA 704, the RED/TED distributions 707, 709 for the servers 706,708 respectively, the RED/TED distributions 711 for the PC 710, and the RED/TED distributions 713 for the Tablet 712. Each device 704, 706, 708, 710, 712 may have one or more RED/TED distributions, each measuring one or more characteristics of the system being monitored.

The management node 702 collects all the RED/TED distributions 705, 707, 709, 711,713 from the individual nodes in the system and builds a deployment-wide collection of distributions 730. So where the RED/TED distributions are local to an individual system and do not take other systems directly into account the aggregate Spatial Event Distribution (SED) 730 provides a total system-wide view of all systems or a subset of systems, and may be used to make statistical decisions based on multiple systems and their correlated behavior.

The systems 704, 706, 708, 710, 712 may be co-located in one facility, or at different geographical locations. The teachings above only require that the Management Node can communicate with the individual systems.

Referring to the example embodiment 700, said communication between the management node 702, and the individual systems may be configured with a transport 720 between the management node 702 and the cell phone 704, another transport 722 between the management node 702 and server 1 706, yet another transport 724 between the management node 702 and server 2 708, another transport 726 between the management node 702 and the PC 710, and another transport 728 between the management node 702 and the Tablet 712. The transports may all be the same, all different, or a combination thereof. By way of example, the transport may be TCP/IP over an Ethernet-based network, or the transport may be TCP/IP over a WiFi/802.11 network.

Each system collects and builds its own RED/TED distributions and sends said distributions to the management node for incorporation into the SEDs.

4.4 Event Transformation (ET)

Raw event data from the interceptors may need one or more transformations to make the event data suitable for building the distributions disclosed previously. Other events require no transformation, if the raw event naturally leads itself to building distributions.

Figure 8:
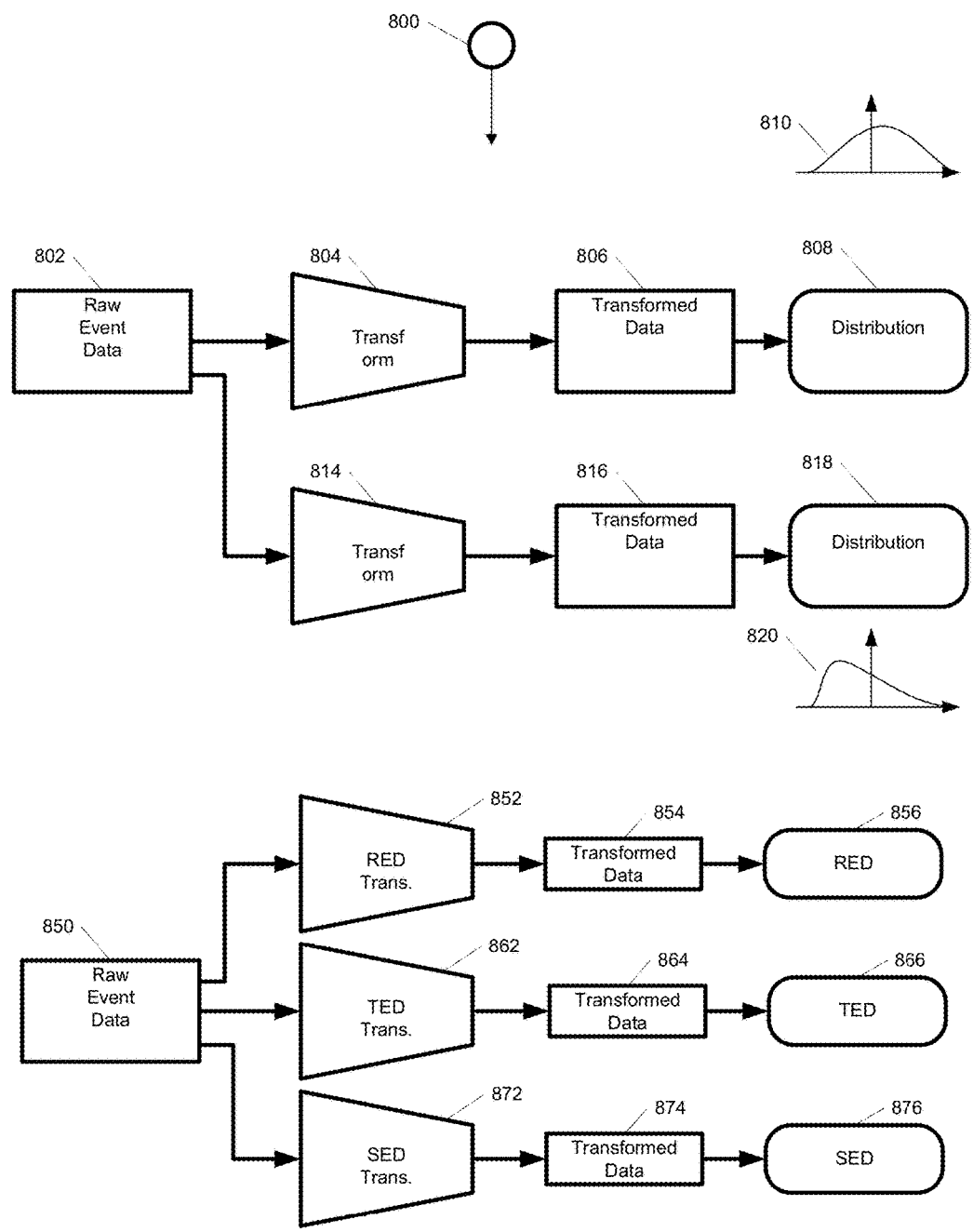
FIG. 8 is a block diagram illustrating the event transformations and generation of multiple events.

FIG. 8 illustrates 800 the transformation of incoming events 802, through the transformation step 804, into transformed data 806. The transformed data 806 serves as the basis for building the above-disclosed distributions 808, 810.

Said transformations may be simple and serve to normalize the event data, or to assign numerical values to event. Transformations may, however, be arbitrary complex and perform any transformation of said event data.

By way of example, a transformation for fwrite( ) may be to calculate the number of bytes written; a transformation for fopen( ) may be to determine the time-of-day for the event in minutes since midnight; and a transformation for a sensor input may be an inverse Hilbert transformation to normalize the data. Another example transformation is the unity-transform, which simply passed the event data straight through without any processing at all. Any transformation is supported by the present invention, and the output of said transformation is used to calculate the previously disclosed distributions.

Additionally, a second transform 814 may be used to generate a second set of transformed data 816 with associated distribution 818, 820. Similarly any number of transforms may be provided and any number of distributions created for each event.

By way of example, if the raw event data 802 is the reading of a sensor, transform 1 804 may normalize the data facility a distribution 808 describing sensor values over time. Transform 2 814 may be a Fourier transform extracting the spectral components of the event stream, and thus facility calculation of the spectrum/distribution 818 of the data stream. The distributions 808, 818 are different and thus provide different ways to measure the same underlying event data.

Transformations may also generate events belonging to different event groups By way of example, if one event group measure number of bytes written while another event group measures duration of write, one underlying write( )

event may be transformed into one new event for each of said two different event groups.

4.4.1 Creation of RED, TED and SED

Event transformations may also be used to create the basic three distributions from any one event. FIG. 8 illustrates by way of example embodiment 800, the creation of the RED 856, TED 866, and SED 876 distributions from one event 850.

The event 850 is copied into three separate instances, and each passed through its own transform. The transform 852 for RED, the transform 862 for TED, and the transform 872 for SED. The transformed data 854, 864, 874 is passed to the individual distributions; RED 856, TED 866, and SED 876 respectively. The transformation subsystem thus provides the infrastructure to generate multiple distributions from one raw data event.

In the preferred embodiment there is one distribution associated with each event. To use all three distributions thus only requires creation of an event for each distribution and the use of the just-disclosed transformation to duplicate the underlying event.

In an alternate embodiment an event may have one or more associated distributions. This essentially combines all distributions for one event or event group into said one event or event group.

4.5 Event and Event Group Hierarchies

As disclosed previously, similar events may be grouped into Event Groups. Event Groups are used to associate related events and to enable broader statistical fault detection.

Figure 9:
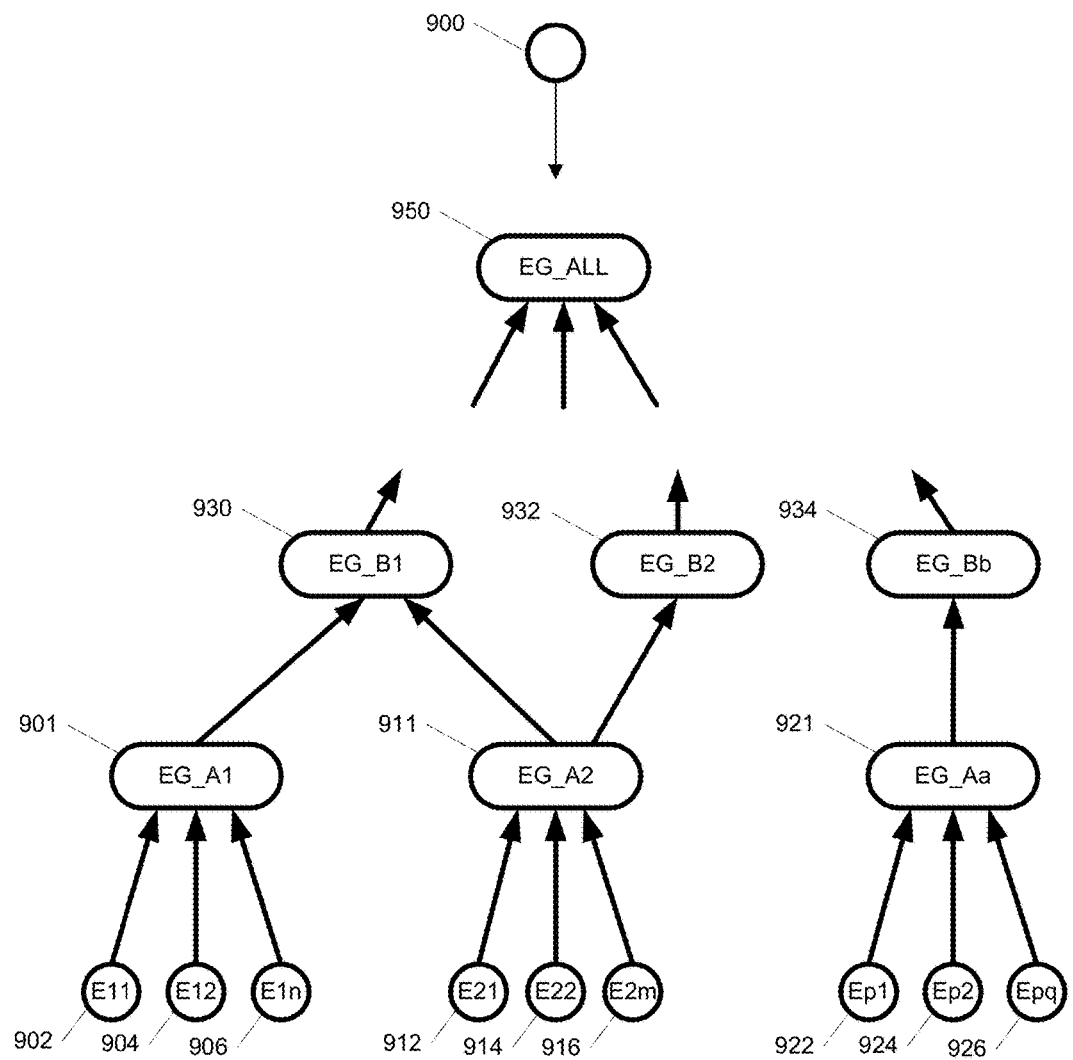
FIG. 9 is a block diagram illustrating event and event group hierarchy.

FIG. 9 illustrates by way of example embodiment 900 an example hierarchy of Events and Event Groups. Events E11 902, E12 904 and E1n 906 are grouped into event group EG_A1 901. Events E21 912, E22 914, and E2m 916 are grouped into event group EG_A2 911. Events Ep1 922, Ep2 924, and Epq 926 are grouped into Event Group EG_Aa 921. In the previous disclosures n, m, p, q, and a represent integers.

Similarly, events in Event Group EG_A1 901 and Event Group EG_A2 911 are grouped into event group EG_B1 930. Events in Event Group EG_A2 are grouped by themselves into EG_B2 932, i.e. EG_B2 contains the same events as EG_A2. Finally, Events in Event Group EG_Aa 921 are grouped exclusively into Event Group EG_Bb 934. Event groups may contain some or all of the events of other event groups, or may have no events in common. The ability to include, exclude, or duplicate events one or more times in the hierarchy of event groups provides the flexibility to do statistical fault detection within sub systems, across sub-systems, or across apparently unrelated sub-systems, as the need may be. Ultimately, all events are members of the all-inclusive Event Group EG_ALL 950, which is comprised of all events.

The flexibility of the just-disclosed event hierarchy may be illustrated by way of example. Referring to the example embodiment 900 on FIG. 9, event group EG_A1 901 may correspond to events for file operations that read data, while event group EG_A2 911 may correspond to events for file operations that write data. Event group EG_B1 930 is thus comprised of events for file operations that read or write data, while event group EG_B2 932 is comprised of just events that write data. For applications where data is being generated and written to disk frequently, EG_B2 932 offers fault detection for just write operations, while EG_B1 offers fault detection for a broader class of both read and write file operations. EG_B2 932 is thus likely a faster fault detector if the storage subsystem has a problem, while EG_B1 930 takes slightly longer to reach statistical significance, but handles a larger set of faults.

Event groups may also be created to separate RED, TED and SED distributions for particular events, or alternatively to group RED, TED and SED distributions for particular events. An event group, by way of example all write( ) methods, may thus be broken further down in to its RED, TED and SED sub groups.

The ability to define a custom hierarchy is thus a powerful way to customize the fault detection capabilities without requiring any specific knowledge about the inner workings of the application being monitored. In the preferred embodiment a hierarchy corresponding to functions in the applications shared libraries is created and event groups assigned to each library. In another preferred embodiment the hierarchy is refined and events are grouped according to their specified functionality (e.g. read, write, create, etc.).

4.6 Event and Event Group Internal Structure

Figure 10:
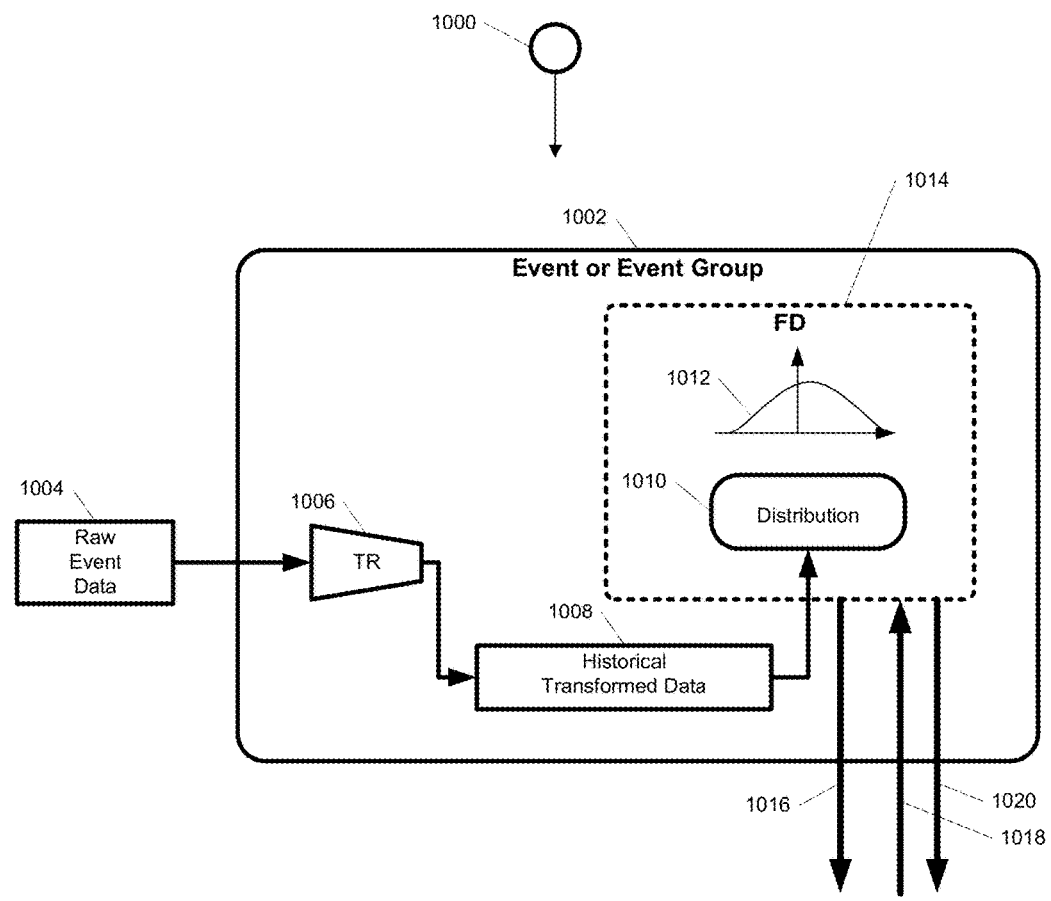
FIG. 10 is a block diagram illustrating fault detection.

FIG. 10 illustrates by way of example embodiment 1000 combined elements of the previous teachings. The internal structures of events and event groups 1002 are similar. Where an event contains one event type and associated distribution an event group contains one or more event types and their associated distribution.

For an event or event group, a raw event 1004 is received and first sent through the transform step 1006. The transformed data is then stored 1008 with other historical transformed data. All distributions require some minimal amount of data in order to be calculated, and historical data for said event or event groups is thus required. The distribution 1010,1012 for said event is then calculated.

The amount of data required for a particular distribution varies depending on the type of distribution and requirements for fault detection time. By way of example, and not limitation, the data included within the historical transformed data 1008 may be the last 1000 events, all the events from the last 24 hours, all events between 8:00 AM and 9:00 AM for the last week, and so on. Depending on distribution and type of fault detection the amount of required data will vary. The historical transformed data 1008 thus contains the data defined by temporal or other rule. By way of example, if the transform requires a specific number of events, the oldest event is removed as new events arrive. By way of example, if the transformed data is all data for the last 24 hours, data older than 24 hours is removed as new data arrives.

As new events arrive 1004 the distribution 1010, 1012 for the event or event group is recalculated. In the alternate embodiment with one or more distributions for each event or event group, all one or more distributions are recalculated.

For each event or event group 1002 Fault Detection 1014 is provided at the level of the individual event or event group. As previously disclosed faults are detected when a sufficient number of events indicate characteristics outside the DV windows as disclosed in section 4.1. Fault Detection 1014 is a capability of the event or event group and is provided in the context of the distribution 1010, 1012 and the chosen measurement of deviation from norm. The fault detection technique applies universally to all distributions, as taught in section 4.1, and is thus identical for REDs, TEDs and SEDs.

Fault Detection may be triggered in multiple different ways: In a preferred embodiment Fault Detection may be triggered after receipt of a new message 1004 and calculation of the distribution 1010, 1012. If the distribution after the new event indicates sufficient deviation from the norm, a fault detection event is generated 1016. The generated fault event 1016 may be stored within the event or event group for later retrieval, or delivered to outside the event or event groups using one of messaging or interrupts.

In an alternate embodiment, the fault detection is polled from 1018 external to the FD 1014, and the result of the fault detection returned 1020.

5 FAULT DETECTION

As disclosed in section 4, fault detection is based on detecting deviation from historical norm using one or more distributions of events. In addition to fault detection at the level of the individual Raw Event Distributions (RED), Temporal Event Distributions (TED), and Spatial Event Distributions (SED), a hierarchy of RED/TED/SED distributions may additionally be used to detect groups of faults, and to correlate fault behavior across events and lower-level event groups. In this context the term "level" means the level of the event hierarchy, and "lower-level" event groups means events or event groups at a lower level within the event and event group hierarchy.

By way of example deviation from the norm may be established when a sufficient number of events indicate characteristics outside the DV windows as disclosed in section 4.1. Section 4.1 also disclosed an example method to determine if there are a sufficient number of events.

Similar teachings apply to TEDs and SEDs. A series of events are thus deemed to indicate a fault if a they in aggregate fall outside the DV window in sufficient numbers.

5.1 Traversal of Fault Detector Hierarchy

The Event Group Hierarchy disclosed above and illustrated on FIGS. 4 and 9 also serves as the underlying structure for fault detection. Each event and event group is comprised of event data and one or more distributions. As disclosed in Section 4.6 an event or an Event Group also contains its own fault detector.

FIG. 9 illustrates by way of example embodiment 900 traversal of the hierarchy of events, event groups and their fault detectors. First the individual events E11 902, E12 904, E1*n* 906, through Epq 926 are queried. If one of the FDs within said events indicates a fault, Fault Detection is triggered corresponding to said event fault. If no faults are indicated, the first layer of event groups EG_A1 901 through EG_Aa 921 is queried. If one of the FDs within said event groups indicates a fault, Fault Detection is triggered corresponding to said event fault. The same teachings apply to all layers, ending with fault detection in the all-inclusive event group comprised of all events EG_ALL.

The events are considered to be the lowest level of the hierarchy while the all-inclusive event group is considered to be at the highest level of the event hierarchy.

If no faults are detected in any of the events of event groups, the system is deemed to operate without faults. If one or more fault detectors indicate a fault, a fault is deemed to have happened. By traversing the entire hierarchy even if a fault is detected, cascading faults may be handled as disclosed below.

Traversal of the hierarchy bottom to top means that very specific fault detectors are tested first, followed by increasingly more generic fault detectors. By way of example, an event for a write ( ) function may indicate significantly longer average write times than normal and thus trigger fault detection at the event level. Alternatively, before any individual write( ) function reaches statistical significance in its fault detection, an event group comprised of all write( ) functions may indicate statistically significant deviation from the norm. An event group with all write( ) functions would thus indicate a fault condition even though no individual write( ) operation has seen enough faults to reach statistical significance. Similarly, if the event group comprised of all write( ) operations doesn't indicate a fault, a larger event group comprised of all file operations may indicate statistically significant deviation from the norm. By traversing the event and event group hierarchy from bottom towards the top, fault detection starts out as specialized as possible and gets increasingly more generic as the hierarchy is traversed.

The fault detection hierarchy as disclosed thus balances rapid fault detection at the individual fault level with the need for broader statistical fault detections across a wide range of functionality.

5.2 Cascading Faults

Faults often cascade through a system, i.e. it's rare that just one fault occurs in isolation.

FIG. 9 illustrates this by way of example embodiment 900. If, by way of example, a storage subsystem has stopped operating, all files operations will fail and quickly generate faults. If events E11 902, E12 904 and E1*n* 906 are events related to write( ) operations, and events E21 912, E22 914 and E2*m* 916 are events related to read( ) operations, all said events would likely indicated faults rapidly. So would EG_A1 901 which represents all events with write( ) operations, and EG_A2 911 which indicate all events with read( ) operations. Finally, EG_B1 930, which may all events with file operations, would likely also indicate faults.

The fault in the storage system thus generates cascading faults starting at the event level all the way up through higher levels. Instead of generating all said fault detections, the present invention suppresses fault detection events corresponding to cascading faults. This is accomplished as follows:

As the event group hierarchy is traversed from the event level through higher-level event groups, it may be determined if a particular event group indicating a fault has the majority of lower-level events or event groups also indicating faults. In that case, the fault detection of said lower level events or event groups may be suppressed and only the fault corresponding to the higher-level event generated. The same test is applied at all levels of the event group hierarchy and only the highest-level event generates a fault detection.

5.3 Consensus Faults

At times the opposite situation to cascading faults occurs. The individual events do not indicate faults with statistical significance, but a higher-level event groups does. In continuation of the example embodiment 900 disclosed in section 5.2: If the storage subsystem only has intermittent errors the individual write( ) and read ( ) fault detectors may not trigger with statistical significance. However, in aggregate, the event groups EG_A1 901 for write( ) or the event group EG_A2 911 for read( ) may reach statistical significance based on receiving fault events from numerous individual event fault detectors. In this case, the high-level event group has reached consensus fault detection even if no individual events indicate a fault with statistical significance.

5.4 Fault Detection for Cloud Computing

Modern data centers may use a "cloud computing" architecture, also called a "distributed computing" architecture, for its deployment. In said cloud-computing deployment the hosted services are provided using a collection of services running on one or more servers. Often, the services are hosted in remote data centers and accessed over the internet (a.k.a "the cloud"). The present invention supports statistical fault detection in such cloud deployment using the teachings above.

FIG. 7 illustrates by way of example embodiment 700 a deployment that may be a cloud deployment. Server 1 706 may be located in one data center, while server 2 708 may be located in the same or another data center. Similarly, the PC 710 may be located in an office, the cell phone/PDA 704 and Tablet 712 are roaming and not generally located in any one place. The management node 702 communicates over the network with said Servers 706, 708, PC 710, cell phone/PDF 704, and a Tablet 712. The respective network connections 722, 724, 726, 720, 728 may be Local Area Networks (LAN), Wide Area Networks (WAN), wireless networks (WN) 802.11 or mobile broadband, or the internet. The present invention does not distinguish between where devices are located, and only requires that devices be able to communicate with the management node 702.

The management node, as previously disclosed, aggregates all distributions 730, and may use said RED/TED/SED distributions 730, to make fault detections on devices running in the cloud.

6.0 CONCURRENT FAULT DETECTION

In large systems or cloud deployments with systems running at multiple sites concurrent fault detection across subsystems or systems may improve fault detection time. Within the disclosures the terminology "concurrent fault detection" designates that one or more systems or sub systems are running fault detection in parallel, i.e. simultaneously. By way of example referring to FIG. 7, fault detection may run both on the server 1 706 and tablet 712 simultaneously. By way of example referring to FIG. 9, Fault detection for events $Ep1$ 922 through $Epq$ 926 may run simultaneously to fault detection in $E11$ 902 through $E1n$ 906.

As disclosed in Section 4.6 and illustrated on FIG. 10 a preferred embodiment calculates the fault detection upon receiving new events. Referring to said preferred embodiment, fault detection is thus concurrent across all events, and only the aggregation of faults for consensus and cascading fault detection is performed synchronously by traversing the event hierarchy, In Cloud deployments concurrent fault detection provides decoupling of local fault detection, i.e. RED/TED fault detection, from the centralized SED fault detection and is the preferred embodiment. For local RED/TED fault detection the preferred embodiments supports both models as disclosed previously.

7. DEPLOYMENT SCENARIOS

FIG. 7 illustrates by way of example embodiment 700 a variety of ways the invention can be configured to operate.

In one embodiment, the invention is configured with a cell phone/PDA 704, two file server 706, 708, a personal computer 710, a tablet 712, and a central management node 720. Communication between the management node 720 and the devices are over transports 720, 722, 724, 726, and 728 respectively. Distributions calculated on each device, 705, 707, 709, 711, 713 are communicated to said management node 720 to collect and aggregate 730 distributions across all devices.

In another embodiment, the invention is configured for just wireless devices such as cell phones 704 and tablets 712 and their respective transports 720, 728. In yet another embodiment, the invention is configured for just wired devices, 706, 708, 710 and their respective transports 722, 724, 726.

In one embodiment the cell phone transport 720 and tablet transport 728 is local wireless, such as WiFi, while in another embodiment said transport is broadband wireless. In yet another embodiment a combination of WifFi and broadband wireless is used.

In another embodiment a combination of wired, Wifi and broadband wireless transports are used.

Finally, as the interceptors are implemented outside the application, the operating system and system libraries, the present invention provides application-agnostic fault detection without requiring any modifications to the application, operating system and system libraries.

The just illustrated example embodiments should not be construed as limiting the scope of the invention but as merely providing illustrations of some of the exemplary embodiments of this invention

8. CONCLUSION

In the embodiments described herein, an example programming environment, systems and configurations were disclosed for which one or more embodiments according to the invention were taught. It should be appreciated that the present invention can be implemented by one of ordinary skill in the art using different program organizations and structures, different data structures, different configurations, different systems, and of course any desired naming conventions without departing from the teachings herein. In addition, the invention can be ported, or otherwise configured for, use across a wide-range of operating system environments.

Although the description above contains many details, these should not be construed as limiting the scope of the invention but as merely providing illustrations of some of the exemplary embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system, comprising:
    one or more memory locations configured to store applications configured to execute on a host with a host operating system;

one or more interceptors configured to intercept calls to the host operating system, and configured to generate one or more statistical events based on said intercepted calls;

a statistical fault detector configured to determine one or more distributions for said one or more statistical events and configured to maintain a hierarchy of events and event groups;

wherein fault detection for said applications is performed by detection of statistically significant deviation of recent events from the corresponding one or more distributions; and wherein faults are detected with a most-specific fault detector first.

2. The system according to claim 1, wherein said operating system is one of Linux, UNIX or Windows.

3. The system according to claim 1, wherein said event groups are created by one of events being grouped according to a library or module wherein the corresponding intercepted method is implemented, by events being grouped according to a subset of the library or module wherein the corresponding intercepted method is implemented, or by custom group.

4. The system according to claim 3, wherein event groups are created by a division of other event groups into one or more of Raw Event Distributions, Temporal Event Distributions, or Spatial Event Distributions.

5. The system according to claim 1, wherein said event groups are comprised of one or more of events corresponding to methods with similar functionality, or a subset of events corresponding to methods with similar functionality.

6. The system according to claim 1, wherein said applications are declared fault-free if no events or event groups indicate fault detection.

7. The system according to claim 1 wherein said applications are declared to contain a fault if one or more events or event groups indicate fault detection.

8. The system according to claim 1, further comprising one or more additional memory locations configured to store the one or more statistical distributions for each one or more statistical events and event groups.

9. The system according to claim 1, further comprising:
traversal of the event and event group hierarchy from individual events to an all-inclusive event group;
determination that at a particular level in the event group hierarchy the majority of lower-level events and event groups indicate fault detection; and
suppression of fault detection events for said lower-level events and event groups and by generation of fault detection events only for said particular event group level.

10. The system according to claim 9, wherein said suppression of fault detection events comprise events from one or more different events or event groups.

11. The system according to claim 9, wherein subsystems corresponding to said particular event level is declared faulty if said level indicates fault detection.

12. The system according to claim 9, wherein said event group level is the highest level in the system indicating fault detection, and any higher-level event groups indicate fault-free operation.

13. The system according to claim 1, further comprising:
traversal of the event and event group hierarchy from individual events to an all-inclusive event group;
determination that at a particular level in the event group hierarchy the lower-level events and event groups do not indicate fault detection; and that an event group at said particular level indicates fault detection; and
declaration of consensus fault detection at said particular level by said event group.

14. The system according to claim 1, wherein said one or more distributions originate from one or more separate hosts, and said fault detection is a fault detection across one or more hosts.

15. The system according to claim 1, wherein said one or more distributions originate from one or more separate hosts, connected via one or more separate transports, and said fault detection is a fault detection across one or more transports.

16. The system according to claim 15, wherein said transports are one or more of local area network, wide area network, 802.11 wireless network, broadband wireless, internet, or other transport.

17. The system according to claim 1, further comprising one or more transformations of each statistical event generating one or more statistical events based on said one or more transformations.

18. The system according to claim 17, wherein said one or more transformations are one or more of normalizing transformation, unity-transform, assignment of numerical value to event, assignment of elapsed time to event, spectral transformation, or other transformation.

19. The system according to claim 17, wherein said one or more transformations are one or more of temporal transformation generating a temporal event distribution, or spatial transformation generating a spatial event distribution.

20. The system according to claim 17, wherein said one or more event transformations generate distributions that belong to events within the same event groups or to events within different event groups.

* * * * *